United States Patent
Nagasaka et al.

(10) Patent No.: US 10,212,772 B2
(45) Date of Patent: Feb. 19, 2019

(54) LED CONTROL DEVICE AND CONTROL METHOD OF LED CONTROL DEVICE

(71) Applicant: SHINDENGEN ELECTRIC MANUFACTURING CO., LTD., Tokyo (JP)

(72) Inventors: Toshihiko Nagasaka, Hanno (JP); Katsuya Ikeda, Hanno (JP); Seiichi Takasaka, Hanno (JP); Shinya Iijima, Hanno (JP); Ryuichi Ito, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/544,447

(22) PCT Filed: Jan. 30, 2017

(86) PCT No.: PCT/JP2017/003098
§ 371 (c)(1),
(2) Date: Jul. 18, 2017

(87) PCT Pub. No.: WO2018/138897
PCT Pub. Date: Aug. 2, 2018

(65) Prior Publication Data
US 2018/0270926 A1 Sep. 20, 2018

(51) Int. Cl.
*H05B 33/08* (2006.01)
*H01M 10/04* (2006.01)

(52) U.S. Cl.
CPC .... *H05B 33/0845* (2013.01); *H01M 10/0431* (2013.01); *H05B 33/0818* (2013.01); *H05B 33/0857* (2013.01)

(58) Field of Classification Search
None
See application file for complete search history.

(56) References Cited

U.S. PATENT DOCUMENTS

2005/0225976 A1* 10/2005 Zampini ................. B63B 45/04
362/227
2007/0159421 A1* 7/2007 Peker .................... G09G 3/3413
345/82

(Continued)

FOREIGN PATENT DOCUMENTS

JP 2011-249145 A 12/2011
JP 2014-120454 A 6/2014

(Continued)

OTHER PUBLICATIONS

International Search Report for Application No. PCT/JP2017/003098, dated Apr. 18, 2017 (3 pages).

(Continued)

*Primary Examiner* — Crystal L Hammond
(74) *Attorney, Agent, or Firm* — Nutter McClennen & Fish LLP

(57) ABSTRACT

In an LED control device, a first integration circuit changes a first reference signal to be different from a second reference signal in one cycle of a first light controlling signal, and a first control unit controls a first switching element by means of a first control signal Gate1 at a first operational frequency for turning on and off a first switching element, the first operational frequency being different from a second operational frequency for turning on and off a second switching element, in one cycle of a first light controlling signal.

15 Claims, 3 Drawing Sheets

(56) References Cited

U.S. PATENT DOCUMENTS

| | | | | |
|---|---|---|---|---|
| 2008/0197789 A1* | 8/2008 | Shiotsu | | H05B 33/0815 |
| | | | | 315/297 |
| 2008/0297065 A1* | 12/2008 | Mubaslat | | B64D 27/04 |
| | | | | 315/291 |
| 2009/0322234 A1* | 12/2009 | Chen | | H05B 33/0815 |
| | | | | 315/159 |
| 2010/0060175 A1* | 3/2010 | Lethellier | | H05B 33/0815 |
| | | | | 315/164 |
| 2012/0086336 A1* | 4/2012 | Tanaka | | H05B 33/0815 |
| | | | | 315/82 |
| 2013/0099684 A1* | 4/2013 | Cheng | | H05B 33/0818 |
| | | | | 315/186 |
| 2015/0312984 A1* | 10/2015 | Kim | | H05B 33/083 |
| | | | | 315/186 |
| 2017/0181242 A1* | 6/2017 | Johnson | | H05B 33/0815 |

FOREIGN PATENT DOCUMENTS

| | | |
|---|---|---|
| JP | 2015-041588 A | 3/2015 |
| KR | 10-2015-0054455 A | 5/2015 |
| WO | 2016/111008 A1 | 7/2016 |

OTHER PUBLICATIONS

Korean Office Action dated Oct. 24, 2018, in Appln. No. 10-2017-7019075.

\* cited by examiner

LED CONTROL DEVICE AND CONTROL METHOD OF LED CONTROL DEVICE

The present application claims priority under 35 U.S.C. § 365 to PCT/JP2017/003098, filed on Jan. 30, 2017, the disclosure of which are incorporated herein by reference.

TECHNICAL FIELD

The present invention relates to an LED control device and a control method of an LED control device.

BACKGROUND ART

LED control devices for controlling the brightness of two (a plurality of) LED devices have been known (for example, see JP 2015-041588 A).

Such conventional LED control devices include, for example, a smoothing circuit that outputs a reference signal obtained by smoothing a PWM light controlling signal, and a control unit that controls a plurality of switching elements for controlling an LED current flowing through each of the LED device based on the reference signal.

The control unit uses a voltage detected by a detection resistor, through which the current flowing through each switching element also flows, to control the LED current flowing through each of the two LED devices to have a value according to the reference signal.

If the two PWM light controlling signals have substantially the same frequency and duty ratio, the operational frequencies of the two switching elements controlled based on the PWM light controlling signals may be synchronized.

The synchronized operational frequencies of the two switching elements affect the detection of the voltage at each switching element. This causes a problem in that the control unit may fail to control each switching element in a desired manner, and thus fail to supply a predefined LED current to the two LED devices.

SUMMARY OF THE INVENTION

Problem to be Solved by the Invention

The object of the present invention therefore is to provide an LED control device in which the operational frequencies of two switching elements configured to control two LED devices with PWM light controlling signals suitable for the respective LED devices are prevented from being synchronized so that a desired control operation may be performed on each of the switching elements to supply a predefined LED current to each of the two LED devices.

Solution to Problem

An LED control device according to an embodiment in an aspect of the present invention is an LED control device configured to control LED devices, including:

a first terminal to which a first electrode of a battery is connected, and a first node of a first LED device and a first node of a second LED device are connected;

a second terminal to which a second electrode of the battery is connected;

a first switching element connected between a second node of the first LED device and the second terminal to control a current flowing through the first LED device;

a first detection resistor through which at least a part of a current flowing through the first switching element flows;

a first integration circuit configured to output a first reference signal REF1 obtained by integrating a first PWM light controlling signal defining a dimming ratio of the first LED device;

a first control unit configured to control an operation of the first switching element by a first control signal based on a relationship between a first reference value obtained from the first reference signal and a first detection voltage value of the first detection resistor;

a second switching element connected between a second node of the second LED device and the second terminal, and configured to control a current flowing through the second LED device;

a second detection resistor through which at least a part of a current flowing through the second switching element flows;

a second integration circuit configured to integrate a second PWM light controlling signal defining a dimming ratio of the second LED device to output a second reference signal REF2; and a second control unit configured to control an operation of the second switching element by a second control signal based on a relationship between a second reference value obtained from the second reference signal and a second detection voltage value at the second detection resistor, wherein the first integration circuit changes the first reference signal to be different from the second reference signal in one cycle of the first PWM light controlling signal, and the first control unit controls, in the one cycle of the first PWM light controlling signal, the first switching element by the first control signal at a first operational frequency for turning on and off the first switching element, the first operational frequency being different from a second operational frequency for turning on and off the second switching element.

The LED control device further includes:

a first capacitor having one end that is connected to the first terminal, and another end that is connected to the second node of the first LED device;

a first coil having one end that is connected to the other end of the first capacitor;

a first diode having a cathode that is connected to the first terminal, and an anode that is connected to another end of the first coil;

a second capacitor having one end that is connected to the first terminal, and another end that is connected to the second node of the second LED device;

a second coil having one end that is connected to the other end of the second capacitor; and a second diode having a cathode that is connected to the first terminal, and an anode that is connected to another end of the second coil, wherein the first switching element has one end that is connected to the other end of the first coil, the first detection resistor has one end that is connected to another end of the first switching element, and another end that is connected to the second terminal, the second switching element has one end that is connected to the other end of the second coil, and the second detection resistor has one end that is connected to another end of the second switching element, and another end that is connected to the second terminal.

In the LED control device, when the first PWM light controlling signal and the second PWM light controlling signal are in synchronization with each other, the first integration circuit integrates the first PWM light controlling signal to output the first reference signal, which is a triangular wave, in the one cycle of the first PWM light controlling signal, and the second integration circuit integrates the second PWM light controlling signal to output the second reference signal, which is a constant DC voltage, in the one cycle of the second PWM light controlling signal.

In the LED control device, the first control unit changes the first operational frequency by the first control signal in the one cycle of the first PWM light controlling signal, and the second control unit controls the second operational frequency to be a constant DC voltage by the second control signal in the one cycle of the second PWM light controlling signal.

In the LED control device, the first control unit turns on the first switching element and then turns off the first switching element when the first detection voltage value of the first detection resistor reaches the first reference value of the first reference signal, and, after turning off the first switching element, turns on the first switching element when a current flowing through the first diode becomes zero, and the second control unit turns on the second switching element and then turns off the second switching element when the second detection voltage value of the second detection resistor reaches the second reference value of the second reference signal, and after tuning off the second switching element, turns on the second switching element when a current flowing through the second diode becomes zero.

In the LED control device, the first integration circuit includes:

a first integration resistor connected between a first signal input terminal, to which the first PWM light controlling signal is supplied, and a first signal output terminal, from which the first reference signal is outputted; and a first integration capacitor connected between the first signal output terminal and the second terminal, and the second integration circuit includes:

a second integration resistor connected between a second signal input terminal, to which the second PWM light controlling signal is supplied, and a second signal output terminal, from which the second reference signal is outputted; and a second integration capacitor connected between the first signal output terminal and the second terminal, and the second integration capacitor has a capacitance that is greater than a capacitance of the first integration capacitor.

In the LED control device, the capacitance of the second integration capacitor is set so that the first reference signal corresponds to a constant DC voltage in the one cycle of the first PWM light controlling signal, and the capacitance of the first integration capacitor is set so that the first reference signal corresponds to a triangular wave in the one cycle of the first PWM light controlling signal.

In the LED control device, the first switching element is a first MOS transistor having a drain that is connected to the other end of the first coil, a source that is connected to the one end of the first detection resistor, and a gate to which the first control signal is inputted, and the second switching element is a second MOS transistor having a drain that is connected to the other end of the second coil, a source that is connected to the one end of the second detection resistor, and a gate to which the second control signal is inputted.

In the LED control device, the first control unit detects the first detection voltage value based on a potential difference between the one end of the first detection resistor and the second terminal, and the second control unit detects the second detection voltage value based on a potential difference between the one end of the second detection resistor and the second terminal, and the second detection resistor has a resistance value that is equal to a resistance value of the first detection resistor.

In the LED control device, the first control unit detects a voltage at the one end of the first coil and a voltage at the other end of the first coil, and determines that the current flowing through the first diode is zero when the voltage at the one end of the first coil becomes equal to or less than the voltage at the other end of the first coil, and turns on the first switching element, and the second control unit detects a voltage at the one end of the second coil and a voltage at the other end of the second coil, and determines that the current flowing through the second diode is zero when the voltage at the one end of the second coil is equal to or less than the voltage at the other end of the second coil, and turns on the second switching element.

The LED control device is mounted on a two-wheel vehicle, and the first LED device and the second LED device are head lamps, tail lamps, or indicators of the two-wheel vehicle.

In the LED control device, the second integration resistor has a resistance value that is equal to a resistance value of the first integration resistor.

In the LED control device, the first LED device emits light with a color that is different from a color of light emitted from the second LED device.

The LED control device further includes a microcomputer configured to output the first PWM light controlling signal and the second PWM light controlling signal based on a command signal commanding the first LED device and the second LED device to emit light, the command signal being inputted from outside.

In a control method of an LED control device according to an embodiment in an aspect of the present invention, the LED control device including:

a first terminal to which a first electrode of a battery is connected, and a first node of a first LED device and a first node of a second LED device are connected;

a second terminal to which a second electrode of the battery is connected;

a first switching element connected between a second node of the first LED device and the second terminal to control a current flowing through the first LED device;

a first detection resistor through which at least a part of a current flowing through the first switching element flows;

a first integration circuit configured to output a first reference signal REF1 obtained by integrating a first PWM light controlling signal defining a dimming ratio of the first LED device;

a first control unit configured to control an operation of the first switching element by a first control signal based on a relationship between a first reference value obtained from the first reference signal and a first detection voltage value of the first detection resistor;

a second switching element connected between a second node of the second LED device and the second terminal, and configured to control a current flowing through the second LED device;

a second detection resistor through which at least a part of a current flowing through the second switching element flows;

a second integration circuit configured to integrate a second PWM light controlling signal defining a dimming ratio of the second LED device to output a second reference signal REF2; and a second control unit configured to control an operation of the second switching element by a second control signal based on a relationship between a second reference value obtained from the second reference signal and a second detection voltage value at the second detection resistor, the method includes:

changing, by the first integration circuit, the first reference signal to be different from the second reference signal in one cycle of the first PWM light controlling signal; and controlling the first switching element by the first control unit by means of the first control signal at a first operational frequency for turning on and off the first switching element that is different from a second operational frequency for turning on and off the second switching element in the one cycle of the first PWM light controlling signal.

Effect of the Invention

An LED control device in an aspect of the present invention is an LED control device configured to control LED devices, including:

a first terminal TS to which a first electrode of a battery Vi is connected, and a first node of a first LED device and a first node of a second LED device are connected;

a second terminal to which a second electrode of the battery Vi is connected;

a first switching element connected between a second node of the first LED device and the second terminal to control a current flowing through the first LED device;

a first detection resistor through which at least a part of a current flowing through the first switching element flows;

a first integration circuit configured to output a first reference signal obtained by integrating a first PWM light controlling signal defining a dimming ratio of the first LED device;

a first control unit configured to control an operation of the first switching element by a first control signal based on a relationship between a first reference value obtained from the first reference signal and a first detection voltage value of the first detection resistor;

a second switching element connected between a second node of the second LED device and the second terminal, and configured to control a current flowing through the second LED device;

a second detection resistor through which at least a part of a current flowing through the second switching element flows;

a second integration circuit configured to integrate (smooth) a second PWM light controlling signal defining a dimming ratio of the second LED device to output a second reference signal REF2; and a second control unit configured to control an operation of the second switching element by a second control signal based on a relationship between a second reference value obtained from the second reference signal and a second detection voltage value at the second detection resistor.

The first integration circuit changes the first reference signal to be different from the second reference signal in one cycle of the first PWM light controlling signal, and the first control unit controls, in the one cycle of the first PWM light controlling signal, the first switching element by the first control signal at a first operational frequency for turning on and off the first switching element, the first operational frequency being different from a second operational frequency for turning on and off the second switching element.

As a result, the first reference signal changes to be different from the second reference signal, and the first switching element is controlled by the first control signal at the first operational frequency for turning on and off the first switching element, the first switching element being different from the second operational frequency for turning on and off the second switching element, in the one cycle of the first PWM light controlling signal.

Thus, in the LED control device according to the present invention, the operational frequencies of the two switching elements that control the two LED devices by corresponding PWM light controlling signals are prevented from synchronizing, so that a desired control operation may be performed on the respective switching elements to supply predefined LED currents to the two LED devices.

BEST MODE FOR CARRYING OUT THE INVENTION

Embodiments of the present invention will be described below with reference to the accompanying drawings.

[First Embodiment]

Figure 1:
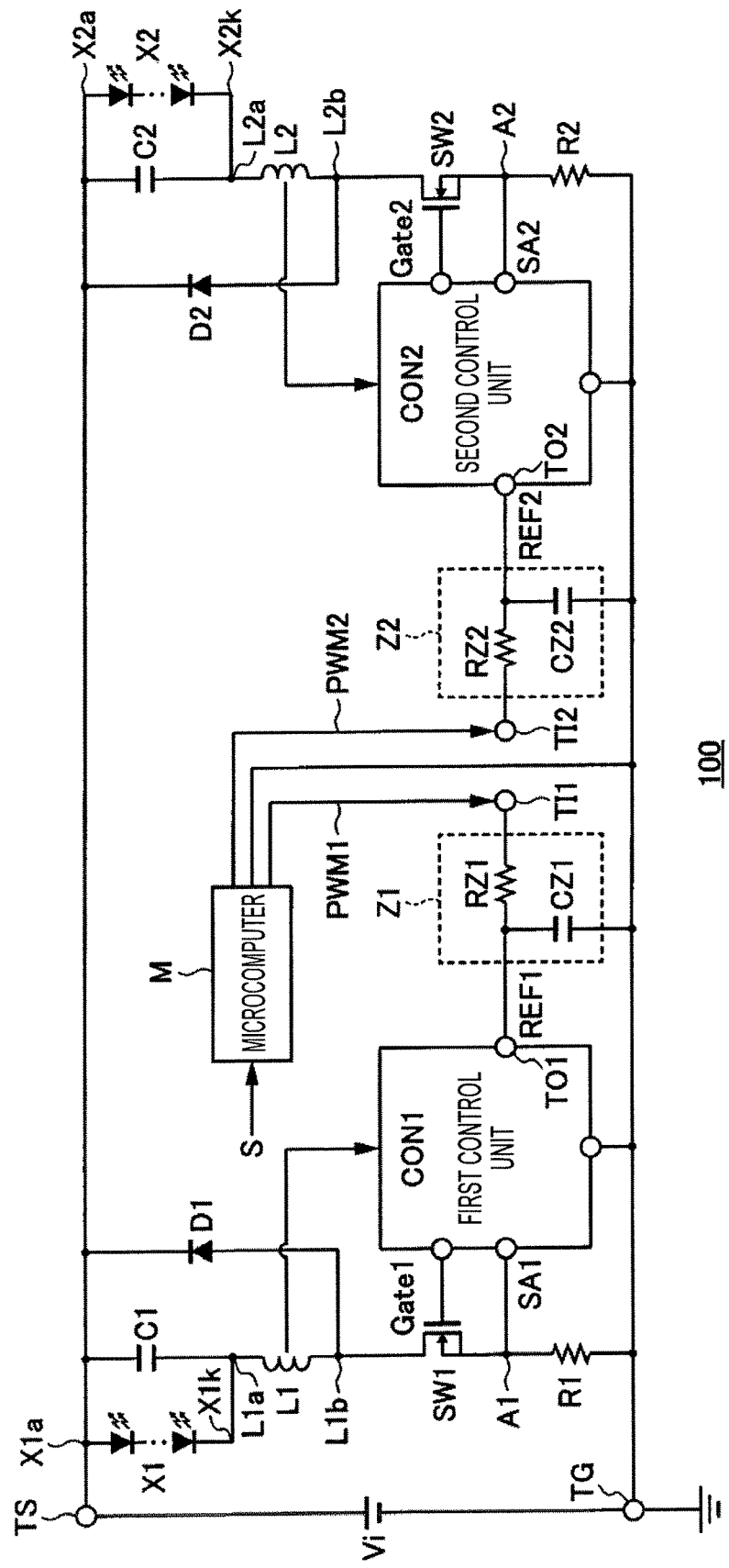
FIG. 1 is a diagram illustrating an example of a configuration of an LED control device 100 according to a first embodiment in an aspect of the present invention.

FIG. 1 is a diagram illustrating an example of a configuration of an LED control device 100 according to a first embodiment in an aspect of the present invention.

As shown in FIG. 1, the LED control device 100 controls a first LED device X1 and a second LED device X2 in response to a command signal S by a voltage supplied from a battery Vi.

The first LED device X1 includes, for example, one LED element or a plurality of LED elements connected in series as shown in FIG. 1. Similarly, the second LED device X2 includes one LED element or a plurality of LED elements connected in series.

The color of light emitted from the first LED device X1 (the wavelength of the output light) is set to be different from the color of light emitted from the second LED device (the wavelength of the output light). The dimming ratio of the first LED device X1 and the dimming ratio of the second LED device X2 are controlled independently of each other in this manner. This results in a synthesized light having a predefined tone.

The first and second LED devices X1 and X2 are used in, for example, lighting devices of consumer electronics. The LED control device may also be used in two-wheel vehicles. In this case, the first and second LED devices X1 and X2 are used in any of the head lamps, the tail lamps, and indicators of the two-wheel vehicles.

As shown in FIG. 1 for example, the LED control device 100 includes a microcomputer M, a first terminal (power supply terminal) TS, a second terminal (ground terminal) TG, a first switching element SW1, a first detection resistor R1, a first capacitor C1, a first coil L1, a first diode D1, a first detection node A1, a first integration circuit Z1, a first control unit CON1, a second switching element SW2, a second detection resistor R2, a second capacitor C2, a second coil L2, a second diode D2, a second detection node A2, a second integration circuit Z2, and a second control unit CON2. The LED control device 100 may also include the battery Vi and the first and second LED devices X1 and X2.

The microcomputer M is configured to output a first PWM light controlling signal PWM1 and a second PWM light controlling signal PWM2 in response to the command signal S, which is inputted from outside to command the first and second LED devices X1 and X2 to emit light. The command signal S is inputted manually by a user (not shown), for example, to the microcomputer M.

The first terminal TS is connected to a first electrode (positive electrode) of the battery Vi. The first terminal TS is also connected to a first node (anode) X1a of the first LED device X1 and a first node (anode) X2a of the second LED device X2.

The second terminal (ground terminal) TG is connected to a second electrode (negative electrode) of the battery Vi and grounded.

The first capacitor C1 has one end that is connected to the first terminal TS, and the other terminal that is connected to a second node (cathode) X1k of the first LED device X1.

The first coil L1 has one end L1a that is connected to the other end of the first capacitor C1.

The first diode D1 has a cathode that is connected to the first terminal TS, and an anode that is connected to the other end L1b of the first coil L1.

The first switching element SW1 is connected between the second node (cathode) X1k of the first LED device X1 and the second terminal TG.

As shown in FIG. 1, for example, the first switching element SW1 is a first MOS transistor having one end (drain) that is connected to the other end of the first coil L1, another end (source) that is connected to one end (first detection node A1) of the first detection resistor R1, and a gate to which a first control signal Gate1 is inputted.

The first switching element SW1 is configured to control a current flowing through the first LED device X1 in response to the first control signal Gate1.

The first detection resistor R1 is connected between the first detection node A1 and the second terminal TG. The first detection resistor R1 has the one end that is connected to the other end (first detection node A1) of the first switching element SW1, and the other end that is connected to the second terminal TG, as shown in FIG. 1.

At least part of the current flowing through the first switching element SW1 (in the example of FIG. 1, all the current flowing through the first switching element SW1) flows through the first detection resistor R1.

The second capacitor C2 has one end that is connected to the first terminal TS, and the other end that is connected to the second node (cathode) X2k of the second LED device X2.

The second coil L2 has one end L2a that is connected to the other end of the second capacitor C2.

The second diode D2 has a cathode that is connected to the first terminal TS, and an anode that is connected to the other end L2b of the second coil L2.

The second switching element SW2 is connected between the second node (cathode) X2k of the second LED device X2 and the second terminal TG.

As shown in FIG. 1, for example, the second switching element SW2 is a second MOS transistor having one end (drain) that is connected to the other end of the second coil L2, another end (source) that is connected to one end (second detection node A2) of the second detection resistor R2, and a gate to which a second control signal Gate2 is inputted.

The second switching element SW2 is configured to control a current flowing through the second LED device X2 in response to the second control signal Gate2.

The second detection resistor R2 is connected between the second detection node A2 and the second terminal TG. As shown in FIG. 1, for example, the second detection resistor R2 has the one end that is connected to the other end (second detection node A2) of the second switching element SW2, and the other end that is connected to the second terminal TG.

At least part of the current flowing through the second switching element SW2 (in the example of FIG. 1, all the current flowing through the second switching element SW2) flows through the second detection resistor R2.

The resistance value of the second detection resistor R2 is set to be equal to the resistance value of the first detection resistor R1.

The first integration circuit Z1 is configured to output a first reference signal REF1 obtained by integrating the first PWM light controlling signal PWM1 defining the dimming ratio of the first LED device X1.

The first integration circuit Z1 is configured to change the first reference signal REF1 to be different from a second reference signal REF2 outputted by the second integration circuit Z2 in one cycle of the first PWM light controlling signal PWM1.

The first integration circuit Z1, for example, integrates the first PWM light controlling signal PWM1 to output a first reference signal REF1 which is a triangular wave corresponding to one cycle of the first PWM light controlling signal PWM1.

For example, the first integration circuit Z1 includes a first integration resistor RZ1 and a first integration capacitor CZ1 as shown in FIG. 1.

The first integration resistor RZ1 is connected between a first signal input terminal TI1 to which the first PWM light controlling signal PWM1 is supplied and a first signal output terminal TO1 from which the first reference signal REF1 is outputted.

The first integration capacitor CZ1 is connected between the first signal output terminal TO1 and the second terminal TG.

With such a configuration, the first integration circuit Z1 integrates the first PWM light controlling signal PWM1 inputted to the first signal input terminal TI1 to output the first reference signal REF1 from the first signal output terminal TO1.

The second integration circuit Z2 is configured to output a second reference signal REF2 obtained by integrating (smoothing) the second PWM light controlling signal PWM2 defining the dimming ratio of the second LED device X2.

The second integration circuit Z2 is configured to integrate the second PWM light controlling signal PWM2 to output the second reference signal REF2 which is a constant DC voltage in one cycle of the second PWM light controlling signal PWM2.

The second integration circuit Z2 includes, for example, a second integration resistor RZ2 and a second integration capacitor CZ2, as shown in FIG. 1.

The second integration resistor RZ2 is connected between a second signal input terminal TI2 to which the second PWM light controlling signal PWM2 is supplied, and a second signal output terminal TO2 from which the second reference signal REF2 is outputted.

The second integration capacitor CZ2 is connected between the second signal output terminal TO2 and the second terminal TG.

The second integration circuit Z2 is configured to integrate the second PWM light controlling signal PWM2 inputted to the second signal input terminal TI2 to output the second reference signal REF2 from the second signal output terminal TO2.

The capacitance of the second integration capacitor CZ2 is set to be greater than the capacitance of the first integration capacitor CZ1. In other words, the capacitance of the first integration capacitor CZ1 is set to be lower than the capacitance of the second integration capacitor CZ2.

The resistance value of the second integration resistor RZ2 is set to be equal to the resistance value of the first integration resistor RZ1.

A signal inputted to the second integration circuit Z2 is smoothed more than a signal inputted to the first integration circuit Z1 before being outputted.

Thus, the capacitance of the second integration capacitor CZ2 is set so that the second reference signal REF2 is a constant DC voltage during the one cycle of the second PWM light controlling signal PWM2. Furthermore, the capacitance of the first integration capacitor CZ1 is set so that the first reference signal REF1 has a triangular wave in one cycle of the first PWM light controlling signal PWM1.

Thus, as described above, the first integration circuit Z1 changes the first reference signal REF1 to be different from the second reference signal REF2 in the one cycle of the first PWM light controlling signal PWM1.

The first control unit CON1 is configured to control the operation of the first switching element SW1 by means of the first control signal Gate1 based on the relationship between a first reference value obtained on the basis of the first reference signal REF1 and a first detection voltage value across the first detection resistor R1.

The first control unit CON1 is configured to detect the first detection voltage value based on a potential difference between the one end (first detection node A1) of the first detection resistor R1 and the second terminal TG.

The first control unit CON1 further is configured to detect a voltage at the one end L1a of the first coil L1 and a voltage at the other end L1b of the first coil L1.

For example, the first control unit CON1 is configured to turn on the first switching element SW1 first, and to turn off the first switching element SW1 when the first detection voltage value of the first detection resistor R1 reaches the first reference value of the first reference signal REF1.

After turning off the first switching element SW1, the first control unit CON1 turns on the first switching element SW1 when the current flowing through the first diode D1 becomes zero.

In more detail, after turning off the first switching element SW1, the first control unit CON1 determines that the current flowing through the first diode D1 is zero when the voltage at the one end L1a of the first coil L1 becomes lower than the voltage at the other end L1b of the first coil L1, and turns on the first switching element SW1.

In particular, the first control unit CON1 changes a first operational frequency of the first switching element SW1 by the first control signal Gate1 in the one cycle of the first PWM light controlling signal PWM1.

The first control unit CON1 thus controls the first switching element SW1 by the first control signal at the first operational frequency for turning on or off the first switching element SW1, the first operational frequency being different from a second operational frequency for turning on or off the second switching element SW2, in the one cycle of the first PWM light controlling signal PWM1.

The second control unit CON2 is configured to control the operation of the second switching element SW2 by the second control signal Gate2 based on the relationship between a second reference value that is based on the second reference signal REF2 and a second detection voltage value across the second detection resistor R2.

The second control unit CON2 detects the second detection voltage value based on a potential difference between the one end (second detection node A2) of the second detection resistor R2 and the second terminal TG.

The second control unit CON2 also detects the voltage at the one end L2a of the second coil L2 and the voltage at the other end L2b of the second coil L2.

For example, the second control unit CON2 turns on the second switching element SW2 first, and turns off the second switching element SW2 when the second detection voltage value at the second detection resistor R2 reaches a second reference value of the second reference signal REF2.

After turning off the second switching element SW2, the second control unit CON2 turns on the second switching element SW2 when the current flowing through the second diode D2 becomes zero.

In more detail, after turning off the second switching element SW2, the second control unit CON2 determines that the current flowing through the second diode D2 is zero when the voltage at the one end L2a of the second coil L2 becomes lower than the voltage at the other end L2b of the second coil L2, and turns on the second switching element SW2.

In particular, the second control unit CON2 controls the second operational frequency of the second switching element SW2 to be at a constant value by the second control signal Gate2 in the one cycle of the second PWM light controlling signal PWM2.

As a result, as described above, the first control unit CON1 controls the first switching element SW1 by the first control signal at the first operational frequency that is different from the constant second operational frequency in the one cycle of the first PWM light controlling signal PWM1.

As described above, the LED control device 100 controls the brightness of the first and second LED devices L1 and L2 in response to the first and second PWM light controlling signals PWM1 and PWM2 outputted from the microcomputer M in accordance with, for example, the operation of the user (the input of the command signal S).

Figure 2:
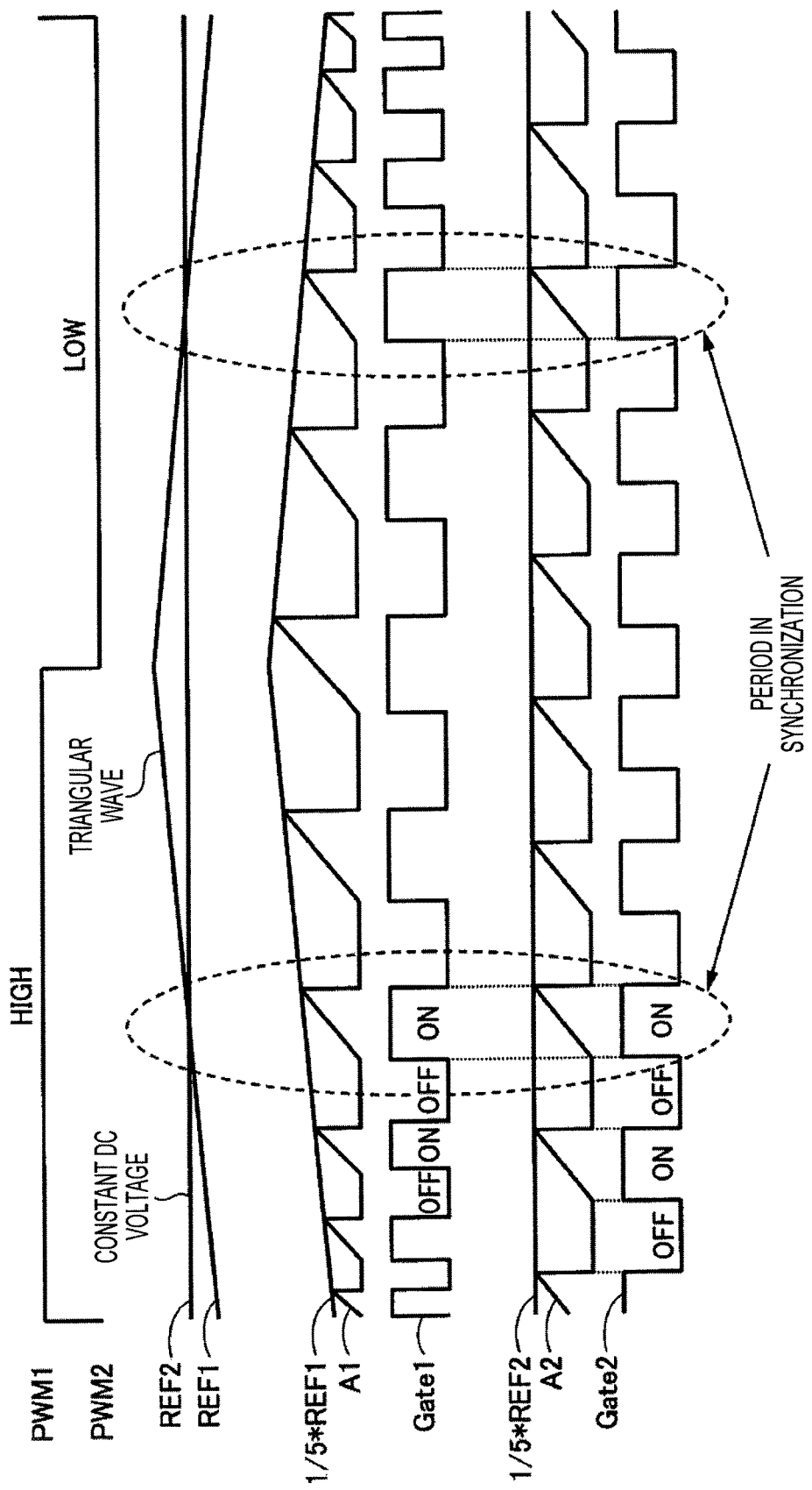
FIG. 2 is a diagram illustrating an example of operation waveforms of the LED control device 100 according to the first embodiment shown in FIG. 1.
Figure 3:
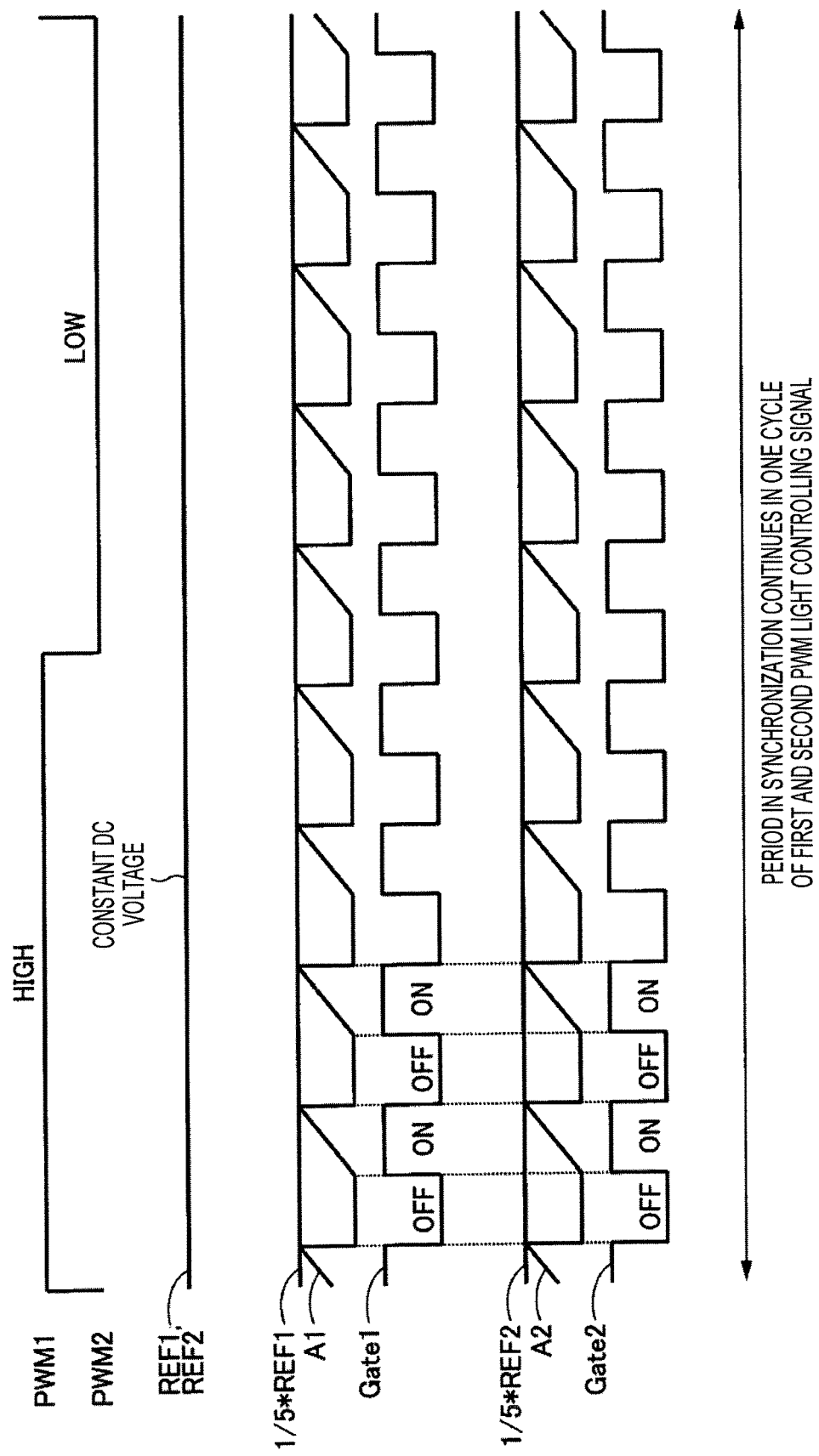
FIG. 3 is a diagram illustrating an example of conventional operation waveforms.

An example of the operation of the LED control device 100 having the above configuration will then be described below. FIG. 2 is a diagram illustrating an example of operation waveforms of the LED control device 100 according to the first embodiment shown in FIG. 1. FIG. 3 is a diagram illustrating an example of conventional operation waveforms. In the example of FIG. 3, the LED control device 100 shown in FIG. 1 is operated according to the conventional operation waveforms. In the examples of FIGS. 2 and 3, the first PWM light controlling signal PWM1 and the second PWM light controlling signal PWM2 are in synchronization with each other (with substantially the same frequency and duty ratio).

For example, in the conventional operation, if the two PWM light controlling signals PWM1 and PWM2 are in synchronization with each other (with substantially the same frequency and duty ratio), the operational frequencies (the frequencies of the first and second control signals Gate1 and Gate2) of the two switching elements SW1 and SW2 controlled based on these PWM light controlling signals are caused to be in synchronization with each other as shown in FIG. 3.

The operations at the synchronized operational frequencies of the two switching elements affect the detection of the current flowing through each of the switching elements. As a result, the first and second control units CON1 and CON2 may fail to control the respective switching elements to operate in a desired manner, and fail to supply the predefined LED currents to the two LED devices.

In contrast, the LED control device 100 according to the first embodiment operates so that, when the first PWM light controlling signal PWM1 and the second PWM light controlling signal PWM2 are in synchronization with each other (with substantially the same frequency and duty ratio), the second integration circuit Z2 integrates the second PWM light controlling signal PWM2 to output the second reference signal REF2, which is a constant DC voltage in the one cycle of the second PWM light controlling signal PWM2, as shown in FIG. 2.

At this time, the first integration circuit Z1 changes the first reference signal REF1 to be different from the second reference signal REF2 outputted from the second integration circuit Z2 in the one cycle of the first PWM light controlling signal PWM1.

In particular, in the example shown in FIG. 2, the first integration circuit Z1 integrates the first PWM light controlling signal PWM1 to output the first reference signal REF1, which is a triangular wave in the one cycle of the first PWM light controlling signal PWM1. In the example of FIG. 2, while the first PWM light controlling signal PWM1 is in a "High" level, the first reference signal REF1 is increased, and while the first PWM light controlling signal PWM1 is in a "Low" level, the first reference signal REF1 is decreased.

The second control unit CON2 controls the operation of the second switching element SW2 by means of the second control signal Gate2 based on the relationship between the second reference value (⅕ of the second reference signal REF2) obtained from the second reference signal REF2, which is a constant DC voltage, and the second detection voltage value (the voltage at the second detection node A2) of the second detection resistor R2.

For example, the second control unit CON2 turns on the second switching element SW2 (by switching the second control signal Gate2 to the "High" level) first, and turns off the second switching element SW2 (by switching the second control signal Gate2 to the "Low" level) when the second detection voltage value of the second detection resistor R2 reaches the second reference value of the second reference signal REF2, which is ⅕*REF2.

After turning off the second switching element SW2 (by switching the second control signal Gate2 to the "Low" level), the second control unit CON2 turns on the second switching element SW2 when the current flowing through the second diode D2 becomes zero.

The second control unit CON2 thus controls the second operational frequency of the second switching element SW2 to be constant by the second control signal Gate2 in the one cycle of the second PWM light controlling signal PWM2.

On the other hand, the first control unit CON1 controls the operation of the first switching element SW1 by the first control signal Gate1 based on the relationship between the first reference value (⅕ of the first reference signal REF1) obtained from the first reference signal REF1 that varies in the aforementioned manner and the first detection voltage value (the voltage at the first detection node A1) of the first detection resistor R1.

For example, the first control unit CON1 turns on the first switching element SW1 (by switching the first control signal Gate1 to the "High" level) first, and turns off the first switching element SW1 (by switching the first control signal Gate1 to the "Low" level) when the first detection voltage value of the first detection resistor R1 reaches the first reference value of the first reference signal REF1, which is ⅕*REF1.

After turning off the first switching element SW1 (by switching the first control signal Gate1 to the "Low" level), the first control unit CON1 turns on the first switching element SW1 (by switching the first control signal Gate1 to the "High" level) when the current flowing through the first diode D1 becomes zero.

Thus, the first control unit CON1 changes the first operational frequency of the first switching element SW1 by the first control signal Gate1 in the one cycle of the first PWM light controlling signal PWM1.

The first control unit CON1 controls the first switching element SW1 by the first control signal Gate1 at the first operational frequency for turning on and off the first switching element SW1, which is different from the second operational frequency for turning on and off the second switching element SW2, in the one cycle of the first PWM light controlling signal PWM1.

As described above, the first reference signal REF1 changes in a manner to be different from the second reference signal REF2 (for example, if one is a triangular wave, the other is a constant DC voltage). As a result, the first switching element is controlled by the first control signal at the first operational frequency for turning on and off the first switching element, which is different from the second operational frequency for turning on and off the second switching element, in the one cycle of the first PWM light controlling signal PWM1.

As shown in FIG. 2, the first operational frequency of the first switching element SW1 changes in accordance with the change in the first reference signal REF1. Thus, the period of time during which the first operational frequency is in synchronization with the second operational frequency of the second switching element SW2 does not continue for a long time.

The LED control device 100 therefore is capable of preventing the synchronization of the operational frequencies of the first and second switching elements SW1 and SW2 that control the first and second LED devices X1 and X2 based on the first and second PWM light controlling signals PWM1 and PWM2 each corresponding to one of the two LED devices X1 and X2 to perform a desired control operation on each of the switching elements. As a result, a predefined LED current may be supplied to each of the first and second LED devices X1 and X2.

If the first and second reference signals REF1, REF2 are different from each other, the operational frequencies of the first and second switching elements SW1 and SW2 do not synchronize. Therefore, the aforementioned problem is not caused.

Thus, in the LED control device 100 according to the first embodiment, each the first and second LED devices X1 and X2 is surely caused to emit light with a predefined dimming ratio in response to the command signal S inputted by the user.

As described above, an LED control device in an aspect of the present invention is an LED control device configured to control LED devices, including:

a first terminal (power supply terminal) TS to which a first electrode (positive electrode) of a battery Vi is connected, and a first node (anode) of a first LED device X1 and a first node (anode) of a second LED device X2 are connected;

a second terminal (ground terminal) to which a second electrode (negative electrode) of the battery Vi is connected;

a first switching element SW1 connected between a second node (cathode) of the first LED device and the second terminal to control a current flowing through the first LED device;

a first detection resistor R1 through which at least a part of a current flowing through the first switching element SW1 flows;

a first integration circuit Z1 configured to output a first reference signal REF1 obtained by integrating a first PWM light controlling signal PWM1 defining a dimming ratio of the first LED device;

a first control unit CON1 configured to control an operation of the first switching element by a first control signal Gate1 based on a relationship between a first reference value obtained from the first reference signal REF1 and a first detection voltage value of the first detection resistor R1;

a second switching element SW2 connected between a second node (cathode) of the second LED device and the second terminal, and configured to control a current flowing through the second LED device;

a second detection resistor R2 through which at least a part of a current flowing through the second switching element SW2 flows;

a second integration circuit Z2 configured to integrate (smooth) a second PWM light controlling signal PWM2 defining a dimming ratio of the second LED device to output a second reference signal REF2; and a second control unit CON2 configured to control an operation of the second switching element by a second control signal Gate2 based on a relationship between a second reference value obtained from the second reference signal REF2 and a second detection voltage value at the second detection resistor R2.

The first integration circuit changes the first reference signal REF1 to be different from the second reference signal REF2 in one cycle of the first PWM light controlling signal PWM1, and the first control unit controls, in the one cycle of the first PWM light controlling signal PWM1, the first switching element by the first control signal at a first operational frequency for turning on and off the first switching element, the first operational frequency being different from a second operational frequency for turning on and off the second switching element.

As a result, the first reference signal REF1 changes to be different from the second reference signal REF2 (for example, if one is a triangular wave, the other is a constant DC voltage), and the first switching element is controlled by the first control signal at the first operational frequency for turning on and off the first switching element, the first switching element being different from the second operational frequency for turning on and off the second switching element, in the one cycle of the first PWM light controlling signal PWM1.

Thus, in the LED control device according to the present invention, the operational frequencies of the two switching elements that control the two LED devices by corresponding PWM light controlling signals are prevented from synchronizing, so that a desired control operation may be performed on the respective switching elements to supply predefined LED currents to the two LED devices.

While certain embodiments have been described, these embodiments have been presented by way of example only, and are not intended to limit the scope of the inventions. The embodiments may be embodied in a variety of other forms. Furthermore, various omissions, substitutions and changes in the form of the methods and systems described herein may be made without departing from the spirit of the inventions. The embodiments and their modifications are included in the scope and the subject matter of the invention, and at the same time included in the scope of the claimed inventions and their equivalents.

Although the MOS transistors are selected as the switching elements in the embodiment, bipolar transistors or other switching elements may also be selected.

EXPLANATION OF REFERENCES

100: LED control device
M: microcomputer
TS: first terminal (power supply terminal)
TG: second terminal (ground terminal)
SW1: first switching element
C1: first capacitor
L1: first coil
D1: first diode
R1: first detection resistor
A1: first detection node
Z1: first integration circuit
CON1: first control unit
SW2: second switching element
C2: second capacitor
L2: second coil
D2: second diode
R2: second detection resistor
A2: second detection node
Z2: second integration circuit
CON2: second control unit
Vi: battery
X1: first LED device
X2: second LED device

The invention claimed is:

1. An LED control device configured to control LED devices, comprising:
a first terminal to which a first electrode of a battery is connected, and a first node of a first LED device and a first node of a second LED device are connected;
a second terminal to which a second electrode of the battery is connected;
a first switching element connected between a second node of the first LED device and the second terminal to control a current flowing through the first LED device;
a first detection resistor through which at least a part of a current flowing through the first switching element flows;

a first integration circuit configured to output a first reference signal obtained by integrating a first PWM light controlling signal defining a dimming ratio of the first LED device;

a first control unit configured to control an operation of the first switching element by a first control signal based on a relationship between a first reference value obtained from the first reference signal and a first detection voltage value of the first detection resistor;

a second switching element connected between a second node of the second LED device and the second terminal, and configured to control a current flowing through the second LED device;

a second detection resistor through which at least a part of a current flowing through the second switching element flows;

a second integration circuit configured to integrate a second PWM light controlling signal defining a dimming ratio of the second LED device to output a second reference signal; and a second control unit configured to control an operation of the second switching element by a second control signal based on a relationship between a second reference value obtained from the second reference signal and a second detection voltage value at the second detection resistor, wherein the first integration circuit changes the first reference signal to be different from the second reference signal in one cycle of the first PWM light controlling signal, and the first control unit controls, in the one cycle of the first PWM light controlling signal, the first switching element by the first control signal at a first operational frequency for turning on and off the first switching element, the first operational frequency being different from a second operational frequency for turning on and off the second switching element.

2. The LED control device according to claim 1, further comprising:

a first capacitor having one end that is connected to the first terminal, and another end that is connected to the second node of the first LED device;

a first coil having one end that is connected to the other end of the first capacitor;

a first diode having a cathode that is connected to the first terminal, and an anode that is connected to another end of the first coil;

a second capacitor having one end that is connected to the first terminal, and another end that is connected to the second node of the second LED device;

a second coil having one end that is connected to the other end of the second capacitor; and a second diode having a cathode that is connected to the first terminal, and an anode that is connected to another end of the second coil, wherein the first switching element has one end that is connected to the other end of the first coil, the first detection resistor has one end that is connected to another end of the first switching element, and another end that is connected to the second terminal, the second switching element has one end that is connected to the other end of the second coil, and the second detection resistor has one end that is connected to another end of the second switching element, and another end that is connected to the second terminal.

3. The LED control device according to claim 2, wherein when the first PWM light controlling signal and the second PWM light controlling signal are in synchronization with each other, the first integration circuit integrates the first PWM light controlling signal to output the first reference signal, which is a triangular wave, in the one cycle of the first PWM light controlling signal, and the second integration circuit integrates the second PWM light controlling signal to output the second reference signal, which is a constant DC voltage, in the one cycle of the second PWM light controlling signal.

4. The LED control device according to claim 3, wherein the first control unit changes the first operational frequency by the first control signal in the one cycle of the first PWM light controlling signal, and the second control unit controls the second operational frequency to be a constant DC voltage by the second control signal in the one cycle of the second PWM light controlling signal.

5. The LED control device according to claim 3, wherein the first control unit turns on the first switching element and then turns off the first switching element when the first detection voltage value of the first detection resistor reaches the first reference value of the first reference signal, and, after turning off the first switching element, turns on the first switching element when a current flowing through the first diode becomes zero, and the second control unit turns on the second switching element and then turns off the second switching element when the second detection voltage value of the second detection resistor reaches the second reference value of the second reference signal, and after tuning off the second switching element, turns on the second switching element when a current flowing through the second diode becomes zero.

6. The LED control device according to claim 2, wherein the first integration circuit includes:

a first integration resistor connected between a first signal input terminal, to which the first PWM light controlling signal is supplied, and a first signal output terminal, from which the first reference signal is outputted; and a first integration capacitor connected between the first signal output terminal and the second terminal, and the second integration circuit includes:

a second integration resistor connected between a second signal input terminal, to which the second PWM light controlling signal is supplied, and a second signal output terminal, from which the second reference signal is outputted; and a second integration capacitor connected between the first signal output terminal and the second terminal, and wherein the second integration capacitor has a capacitance that is greater than a capacitance of the first integration capacitor.

7. The LED control device according to claim 6, wherein the capacitance of the second integration capacitor is set so that the first reference signal corresponds to a constant DC voltage in the one cycle of the first PWM light controlling signal, and the capacitance of the first integration capacitor is set so that the first reference signal corresponds to a triangular wave in the one cycle of the first PWM light controlling signal.

8. The LED control device according to claim 7, wherein
the first switching element is a first MOS transistor having a drain that is connected to the other end of the first coil, a source that is connected to the one end of the first detection resistor, and a gate to which the first control signal is inputted, and
the second switching element is a second MOS transistor having a drain that is connected to the other end of the second coil, a source that is connected to the one end of the second detection resistor, and a gate to which the second control signal is inputted.

9. The LED control device according to claim 8, wherein
the first control unit detects the first detection voltage value based on a potential difference between the one end of the first detection resistor and the second terminal, and
the second control unit detects the second detection voltage value based on a potential difference between the one end of the second detection resistor and the second terminal,
and wherein
the second detection resistor has a resistance value that is equal to a resistance value of the first detection resistor.

10. The LED control device according to claim 9, wherein
the first control unit detects a voltage at the one end of the first coil and a voltage at the other end of the first coil, and determines that the current flowing through the first diode is zero when the voltage at the one end of the first coil becomes equal to or less than the voltage at the other end of the first coil, and turns on the first switching element, and
the second control unit detects a voltage at the one end of the second coil and a voltage at the other end of the second coil, and determines that the current flowing through the second diode is zero when the voltage at the one end of the second coil is equal to or less than the voltage at the other end of the second coil, and turns on the second switching element.

11. The LED control device according to claim 6, wherein
the LED control device is mounted on a two-wheel vehicle, and
the first LED device and the second LED device are head lamps, tail lamps, or indicators of the two-wheel vehicle.

12. The LED control device according to claim 6, wherein the second integration resistor has a resistance value that is equal to a resistance value of the first integration resistor.

13. The LED control device according to claim 1, wherein the first LED device emits light with a color that is different from a color of light emitted from the second LED device.

14. The LED control device according to claim 1, further comprising a microcomputer configured to output the first PWM light controlling signal and the second PWM light controlling signal based on a command signal commanding the first LED device and the second LED device to emit light, the command signal being inputted from outside.

15. A control method of an LED control device, the LED control device including:
a first terminal to which a first electrode of a battery is connected, and a first node of a first LED device and a first node of a second LED device are connected;
a second terminal to which a second electrode of the battery is connected;
a first switching element connected between a second node of the first LED device and the second terminal to control a current flowing through the first LED device;
a first detection resistor through which at least a part of a current flowing through the first switching element flows;
a first integration circuit configured to output a first reference signal obtained by integrating a first PWM light controlling signal defining a dimming ratio of the first LED device;
a first control unit configured to control an operation of the first switching element by a first control signal based on a relationship between a first reference value obtained from the first reference signal and a first detection voltage value of the first detection resistor;
a second switching element connected between a second node of the second LED device and the second terminal, and configured to control a current flowing through the second LED device;
a second detection resistor through which at least a part of a current flowing through the second switching element flows;
a second integration circuit configured to integrate a second PWM light controlling signal defining a dimming ratio of the second LED device to output a second reference signal; and
a second control unit configured to control an operation of the second switching element by a second control signal based on a relationship between a second reference value obtained from the second reference signal and a second detection voltage value at the second detection resistor,
the method comprising:
changing, by the first integration circuit, the first reference signal to be different from the second reference signal in one cycle of the first PWM light controlling signal; and
controlling the first switching element by the first control unit by means of the first control signal at a first operational frequency for turning on and off the first switching element that is different from a second operational frequency for turning on and off the second switching element in the one cycle of the first PWM light controlling signal.

* * * * *